US011263911B2

(12) United States Patent
Dvonch

(10) Patent No.: US 11,263,911 B2
(45) Date of Patent: Mar. 1, 2022

(54) SYSTEMS AND METHODS FOR IDENTIFYING AIR TRAFFIC OBJECTS

(71) Applicant: Sensors Unlimited, Inc., Princeton, NJ (US)

(72) Inventor: Curt Dvonch, Salt Lake City, UT (US)

(73) Assignee: Sensors Unlimited, Inc., Princeton, NJ (US)

(*) Notice: Subject to any disclaimer, the term of this patent is extended or adjusted under 35 U.S.C. 154(b) by 276 days.

(21) Appl. No.: 16/100,138

(22) Filed: Aug. 9, 2018

(65) Prior Publication Data
US 2020/0051444 A1 Feb. 13, 2020

(51) Int. Cl.
*G08G 5/00* (2006.01)
*G06T 7/70* (2017.01)

(52) U.S. Cl.
CPC ............. *G08G 5/0082* (2013.01); *G06T 7/70* (2017.01); *G08G 5/0026* (2013.01); *G06T 2207/10048* (2013.01); *G06T 2207/30261* (2013.01)

(58) Field of Classification Search
CPC .... G08G 5/0082; G08G 5/0026; G08G 5/025; G08G 5/0017; G08G 5/0073; G06T 7/70; G06T 2207/30261; G06T 2207/10048
See application file for complete search history.

(56) References Cited

U.S. PATENT DOCUMENTS

| | | | | |
|---|---|---|---|---|
| 6,157,876 A * | 12/2000 | Tarleton, Jr. | ............ | G01S 3/785 244/183 |
| 6,577,339 B1 * | 6/2003 | Thompson | ......... | G02B 23/2484 340/540 |
| 6,628,321 B1 * | 9/2003 | Nutaro | ...................... | H04N 7/18 348/40 |
| 7,225,063 B2 * | 5/2007 | Tart | ........................ | G05D 1/106 701/4 |
| RE45,452 E * | 4/2015 | Kerr | .......................... | G01S 1/70 348/117 |
| 9,684,075 B2 | 6/2017 | Xue et al. | | |
| 9,904,859 B2 * | 2/2018 | Grauer | .............. | H04N 5/23216 |
| 2005/0231419 A1 | 10/2005 | Mitchell | | |
| 2008/0310850 A1 * | 12/2008 | Pederson | ................. | G07C 9/37 398/135 |
| 2010/0231721 A1 * | 9/2010 | Meloche | ................ | G08G 5/065 348/159 |

FOREIGN PATENT DOCUMENTS

EP 1989681 A2 11/2008
WO WO-2007095282 A2 * 8/2007 ............. G08G 5/025

OTHER PUBLICATIONS

Extended European Search Report for European Patent Application No. EP 19191012.4, dated Jan. 31, 2020.

* cited by examiner

*Primary Examiner* — Alan D Hutchinson
(74) *Attorney, Agent, or Firm* — Scott D. Wofsy; Joshua L. Jones; Judy R. Naamat

(57) ABSTRACT

An identification system for a digital air traffic control center includes a sensor with a field of view and having a pulse detection array, a user interface to display air traffic objects in the field of view of the sensor, and a controller. The controller includes a pulse detection module disposed in communication with the pulse detection array to identify an air traffic object using pulsed illumination emitted by a pulsed illuminator carried by the air traffic object within the field of view of the sensor. Digital air traffic control centers, airfields, and air traffic object identification methods are also described.

20 Claims, 4 Drawing Sheets

SYSTEMS AND METHODS FOR IDENTIFYING AIR TRAFFIC OBJECTS

BACKGROUND OF THE INVENTION

1. Field of the Invention

The present disclosure relates to air traffic control, and more particularly to identification systems for digital air traffic control centers and methods of identifying air traffic objects.

2. Description of Related Art

Traffic control centers, such as in airfield control towers, are commonly positioned on the airfield for purposes of controlling movement of aircraft both on the airfield and in airspace in the vicinity of the airfield. Positioning the control tower at the airfield allows human controllers operating from the control tower to have situation awareness as to aircraft movements on and around the airfield. Proximity to the air traffic itself has traditionally provided the advantage that the human controllers can visually see aircraft moving on the airfield and in the immediate vicinity of the airfield.

With the proliferation of sensors it has become possible to move the functions provided by the airfield human controller off the airfield and to locations remote from the airfield. Moving the human controllers off the airfield frees space at the airfield for other uses, improving the efficiency of airfield operations. Such traffic control towers typically include imaging devices that communicate live imagery of airfield activity to the remote location, allowing the human controllers to control airfield operations from a secure location and monitor activity. This reduces the airfield footprint and leaves the human air traffic controllers less exposed to threats.

Such conventional methods and systems have generally been considered satisfactory for their intended purpose. However, there is still a need in the art for improved identification systems for digital air traffic control centers, airfield digital air traffic control centers, and air traffic object identification methods. The present disclosure provides a solution for this need.

SUMMARY OF THE INVENTION

An identification system for a digital air traffic control center includes a sensor having a pulse detection array with a field of view, a user interface to display air traffic objects in the field of view of the sensor, and a controller. The controller includes a pulse detection module disposed in communication with the pulse detection array to identify an air traffic object using pulsed illumination emitted by a pulsed illuminator carried by the air traffic object within the field of view of the sensor.

In certain embodiments the sensor can be fixed to a mast. The sensor can be located at an airfield. The field of view of the sensor can include controlled airspace. The controlled airspace can be within the environs of an airfield. The user interface can be remotely linked to the sensor. The identification system can employed in an airfield digital air traffic control center, such as a military or a civil airfield. The air traffic object can be a fixed wing or rotary wing aircraft.

In accordance with certain embodiments, the pulse detection array can be a visible wavelength waveband pulse detection array. The pulse detection array can be an infrared waveband pulse detection array. The pulse detection array can be a long-wave infrared (LWIR) pulse detection array. The pulse detection array can be a mid-wave infrared (MWIR) pulse detection array. The pulse detection array can be a short-wave infrared (SWIR) pulse detection array. An aircraft recognition module can be disposed in communication with the pulse detection array and operatively associated with the display.

It is also contemplated that, in accordance with certain embodiments, the air traffic object can carry a pulsed illuminator arranged for emitting pulsed illumination. A pulsed illumination modulation module can be operatively associated with the pulsed illuminator. The pulsed illumination modulation module can be configured to modulate pulsed illumination emitted from the pulsed illuminator. The pulsed illuminator can be one of a visible waveband, an infrared waveband, LWIR, MWIR, and/or SWIR pulsed illuminator. The pulsed illuminator can be configured to emit pulsed illumination in one of a visible, an infrared, an LWIR, an MWIR, and/or a SWIR waveband.

An air traffic object identification method includes emitting pulsed illumination from a pulsed illuminator carried by an air traffic object. The emitted pulsed illumination is received at a sensor with a pulse detection array from within a field of view of the sensor and the air traffic object identified using the pulsed illumination. The identity of the air traffic object is displayed on a user interface disposed in communication with the sensor, the user interface remote from the field of view of the sensor.

In certain embodiments, the method can include modulating the pulsed illumination with the identity of the air traffic object at the air traffic object. Emitting pulsed illumination can include emitting one of a visible waveband, an infrared waveband, an LWIR sub-waveband, an MWIR sub-waveband, and/or a SWIR sub-waveband pulsed illumination. The air traffic object can be recognized using the sensor. For example, the sensor can recognize the type of air traffic object using illumination reflected (or emitted) from the air traffic object in one of a visible, an infrared, an LWIR, an MWIR, and/or a SWIR.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
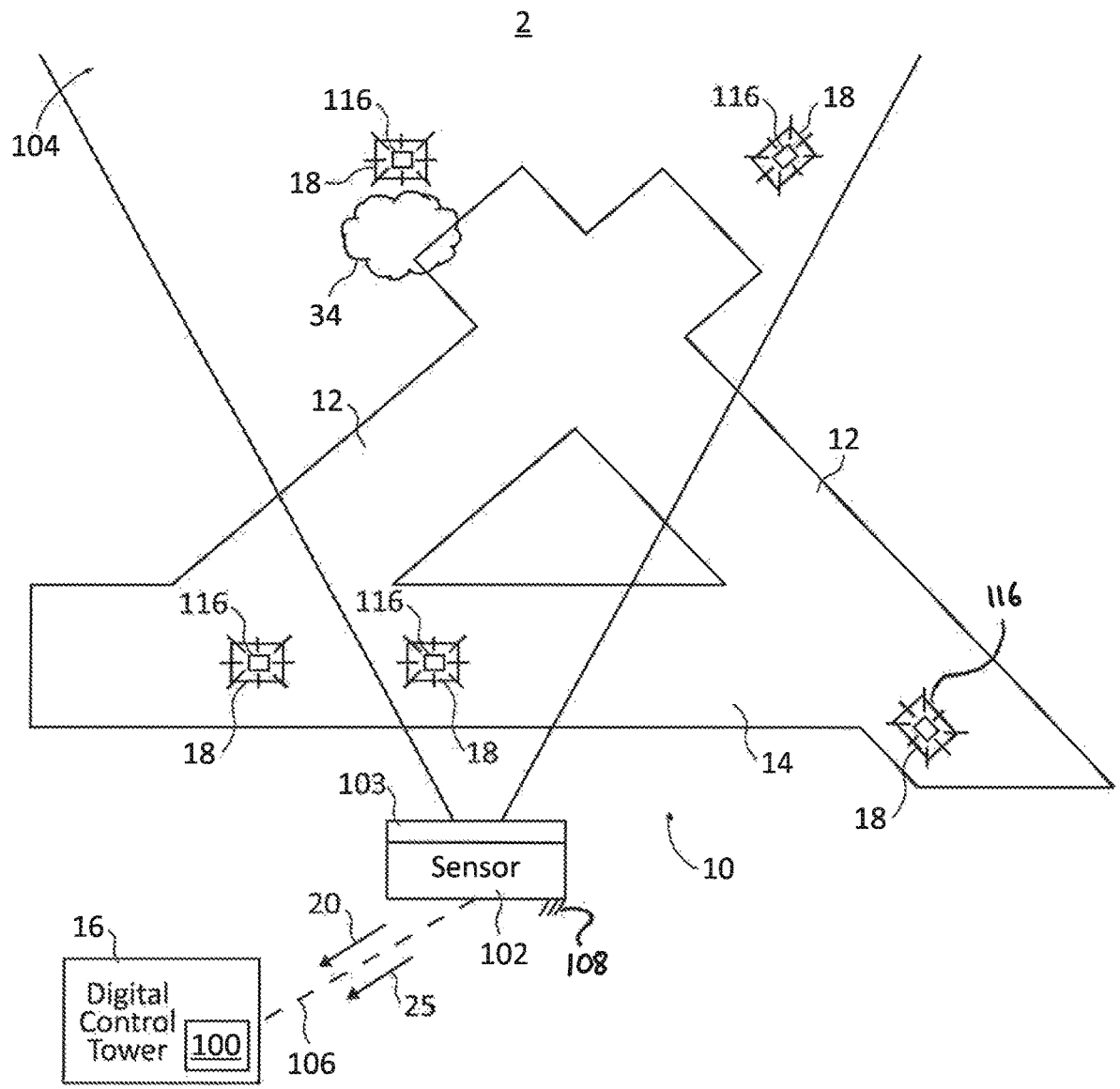
FIG. 1 is a schematic view of an exemplary embodiment of a civil or military airfield constructed in accordance with the present disclosure including an identification system for a digital air traffic control center, showing a sensor located at the airfield and disposed in communication with a remote digital air traffic control center.

Reference will now be made to the drawings wherein like reference numerals identify similar structural features or aspects of the subject disclosure. For purposes of explanation and illustration, and not limitation, a partial view of an exemplary embodiment of an air traffic identification system for a digital air traffic control center in accordance with the disclosure is shown in FIG. 1 and is designated generally by reference character 100. Other embodiments of air traffic identification systems, civil and military airfields having digital air traffic control center with air traffic identification systems, and methods of identifying air traffic objects in accordance with the disclosure, or aspects thereof, are provided in FIGS. 2A-4, as will be described. The systems and methods described herein can be used for identifying air traffic objects, such as in remote digital air traffic control centers for civil and military airfields, though the present disclosure is not limited to remote digital air traffic control centers or to air traffic object identification in general.

The human eye responds to light within the visible portion of the electromagnetic spectrum. Visible light is generally understood to have wavelengths between about 380 nanometers and about 720 nanometers. Electromagnetic radiation with wavelengths below 380 nanometers is generally described as ultraviolet radiation. Electromagnetic radiation with wavelengths above 720 nanometers is generally described as infrared radiation.

The infrared portion of the electromagnetic spectrum is typically divided into the near-infrared (NIR) infrared spectrum portion, the short-wave infrared (SWIR) infrared spectrum portion, the mid-wave infrared (MWIR) infrared spectrum portion, and the long-wave (LWIR) infrared spectrum portion. As used herein, NIR refers to electromagnetic radiation with a wavelength between about 0.7 microns and about 1 micron. SWIR refers to electromagnetic radiation with a wavelength between about 0.9 microns and about 1.7 microns. MWIR refers to electromagnetic radiation with a wavelength between about 3 microns and 5 microns. LWIR refers to electromagnetic radiation with a wavelength between about between about 8 microns and 14 microns.

Referring to FIG. 1, an airfield 10 is shown. Airfield 10 includes one or more runways 12, a ramp 14, and a digital air traffic control center 16, e.g., a remote digital control tower. Digital air traffic control center 16 is configured and adapted for controlling the movement of air traffic objects 18 on ramp 14 and the one or more runways 12 of airfield 10 as well as in environs 2 of airfield 10, environs 2 as used herein meaning within the effective field of view of digital air traffic control center 16. Airfield 10 also includes a sensor 102 with a pulse detection array 103 having a field of view 104 spanning at least a portion of environs 2, ramp 14, and the one or more runways 12. It is contemplated that digital air traffic control center 16 be remote from airfield 10, remote meaning that operators at digital air traffic control center 16 be are unable to directly view airfield 10 without the aid of remote sensors, e.g., sensor 102.

One or more of air traffic objects 18 located on ramp 14, runways 12, and in environs 12 carry a pulsed illuminator 116. The pulsed illuminator 116 is configured and adapted to emit pulsed illumination in predetermined waveband and modulated with information identifying the respective air traffic object 18. It is contemplated that the pulsed illuminator 116 be optically coupled to the sensor 102 for communicating the identity of air traffic object 18 at relatively long range, e.g., outside of visible range and/or through an atmospheric obscurant 34. Examples of atmospheric obscurants include fog, haze, and smog by way of non-limiting examples.

Sensor 102 is configured and adapted for acquiring image data 20 of a scene including at least a portion of environs 2, ramp 14, and the one or more runways 12. Image data 20 is provided to an air traffic object recognition module 120 (shown in FIG. 3), which recognizes air traffic objects 18 according to size or shape. Pulse detection array 103 is configured and adapted for acquiring pulse data 25 emitted from pulsed illuminators 116 carried by air traffic objects 18, which pulse detection array 103 provides to an air traffic object identification module 122 (shown in FIG. 3), which air traffic object identification module 122 uses to identify air traffic control objects 18, e.g., by tail number.

In certain embodiments airfield 10 can be a terrestrial airfield. Examples of terrestrial airfields include general aviation and commercial airfield installations. In accordance with certain embodiments, airfield 10 can be a marine airfield. Examples of marine airfields include small deck and large deck military aircraft carriers, landing pads on military and commercial marine vessels, and landing facilities on fixed marine structures like oil drilling and exploration platforms. Air traffic objects 18 can include fixed wing aircraft, rotary wing aircraft, and/or autonomous air vehicles, as suitable for a given application.

Sensor 102 is co-located with airport 10 and has a field of view 104 encompassing at least a portion of the airfield 10 and environs 2. For example, sensor 102 can be mounted on a mast or gimbal structure 108. Mast of gimbal structure 108 can be fixed or can provide pan, tilt, and/or zoom capability to sensor 102. As will be appreciated by those of skill in the art in view of the present disclosure, use of a mast or gimbal structure can increase size of field of view 104. In this respect it is contemplated that as few as one sensor 102 provide coverage sufficient such that image data 20 is representative, and timely, to safely control movement of air traffic objects 18 on airfield 10 as well as in environs 2 of airfield 10 by recognizing the respective air traffic object type. Further, it is also contemplated as few as one pulse detection array 103 provide coverage sufficient such that pulse data 25 provide identification information for controlling the timely and safe movement of air traffic objects 18 on airfield 10 as well as in environs 2 of airfield 10 according to identify of individual air traffic objects 18.

As shown with the dashed line indicating data link 106, it is contemplated that digital air traffic control center 16 be remote from airfield 10 and include air traffic identification system 100. In this respect digital air traffic control center 16 can located away from airfield 10, e.g., outside of the field of view 104 of sensor 102. Placing digital air traffic control center 16 at a remote location frees space on airfield 10 for airfield operations, improving airfield efficiency. Placing digital air traffic control center 16 at a remote location can also reduce the resources necessary to secure digital air traffic control center 16, such as by co-siting identification system 100 and its users with other assets requiring security.

Referring to FIGS. 2A-2E, sensor 102, pulse detection array 103, and pulsed illuminator 116 are shown according to exemplary embodiments. Air traffic objects 18 each carry a pulsed illumination modulation module 118 and a pulsed illuminator 116. Pulsed illumination modulation module 118 is operatively associated with pulsed illuminator 116 and is arranged to cause pulsed illuminator to emit pulsed illumination in a predetermined waveband or sub-waveband. Pulse detection array 103 and sensor 102 are configured and adapted to generate both image data 24, for air traffic object recognition using illumination reflected from air traffic objects, and pulse data 25, for identification of individual air traffic objects using pulsed illumination emitted by pulsed illuminator 116.

Figure 2A:
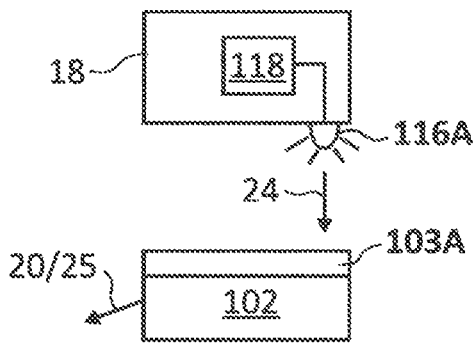
FIGS. 2A-2E are schematic views of embodiments of the identification system of FIG. 1, showing air traffic objects carrying pulsed illuminators and sensors with pulse detection arrays configured for exemplary wavebands and sub-wavebands of pulsed illumination, respectively.

For example, as shown in FIG. 2A, in certain embodiments, air traffic object 18 can carry a visible waveband pulsed illuminator 116A. Visible waveband pulsed illuminator 116A is arranged to emit visible waveband pulsed illumination 24 according to modulation information provided by illumination modulation module 118. Visible waveband pulse detection array 103A, individually and/or cooperation with sensor 102, generates image data 20 and pulse data 25 for recognizing and identifying air traffic object 18 using visible waveband pulsed illumination 24.

Figure 2B:
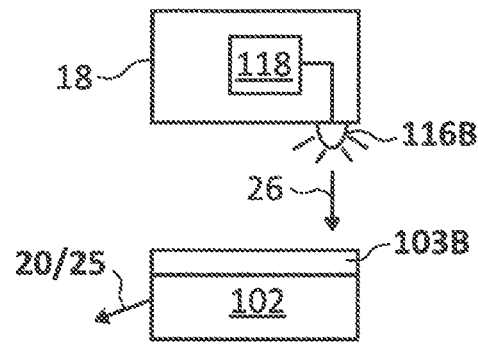

As shown in FIG. 2B, in accordance with certain embodiments, air traffic object 18 can carry an infrared pulsed illuminator 116B. Infrared pulsed illuminator 116B is arranged to emit infrared waveband pulsed illumination 26 according to modulation information provided by illumination modulation module 118. Infrared waveband pulse detection array 103B, individually and/or cooperation with sensor 102, generates image data 20 and pulse data 25 for recognizing and identifying air traffic object 18 using infrared waveband pulsed illumination 26.

Figure 2C:
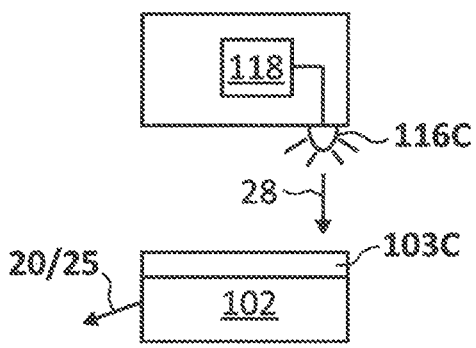

As shown in FIG. 2C, in accordance with certain embodiments, air traffic object 18 can carry an MWIR sub-waveband pulsed illuminator 116C. MWIR pulsed illuminator 116C is arranged to emit MWIR pulsed illumination 28 according to modulation information provided by illumination modulation module 118. MWIR pulse detection array 103C, individually and/or cooperation with sensor 102, generates image data 20 and pulse data 25 for recognizing and identifying air traffic object 18 using MWIR pulsed illumination 28.

Figure 2D:
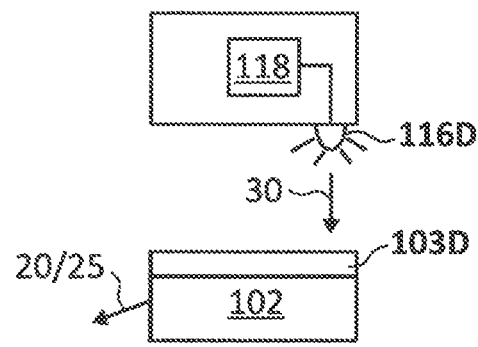

As shown in FIG. 2D, in accordance with certain embodiments, air traffic object 18 can carry an LWIR sub-waveband pulsed illuminator 116D. LWIR pulsed illuminator 116D is arranged to emit LWIR pulsed illumination 30 according to modulation information provided by illumination modulation module 118. LWIR pulse detection array 103D, individually and/or cooperation with sensor 102, generates image data 20 and pulse data 25 for recognizing and identifying air traffic object 18 using LWIR pulsed illumination 30.

Figure 2E:
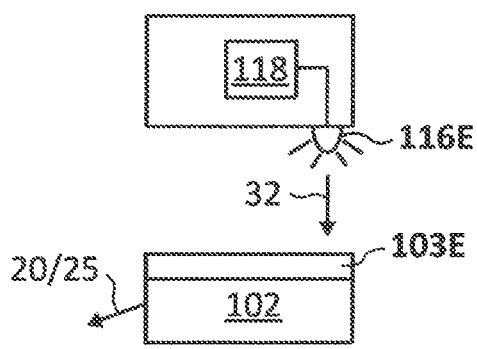

As shown in FIG. 2E, it is also contemplated that air traffic object 18 can carry a SWIR illuminator 116E. SWIR pulsed illuminator 116E is arranged to emit SWIR pulsed illumination 32 according to modulation information provided by illumination modulation module 118. SWIR sub-waveband pulse detection array 103E, individually and/or cooperation with sensor 102, generates image data 20 and pulse data 25 for recognizing and identifying air traffic object 18 using SWIR pulsed illumination 32. As will be appreciated by those of skill in the art in view of the present disclosure, the use of infrared waveband illumination to generate image data 20 (shown in FIG. 1) and pulse data 25 has the benefit of improved visibility when imaging through an atmospheric obscurant 34, e.g., dust, haze, smog, and smoke. Improved visibility in turn allows for recognition of air traffic objects 18 at relatively long ranges, thereby extending the effective depth of field of view 104 of sensor 102. This is particularly true in the case of SWIR pulsed illumination, which can extend the identification range out beyond that of the sensing range of co-sited air traffic control centers.

Figure 3:
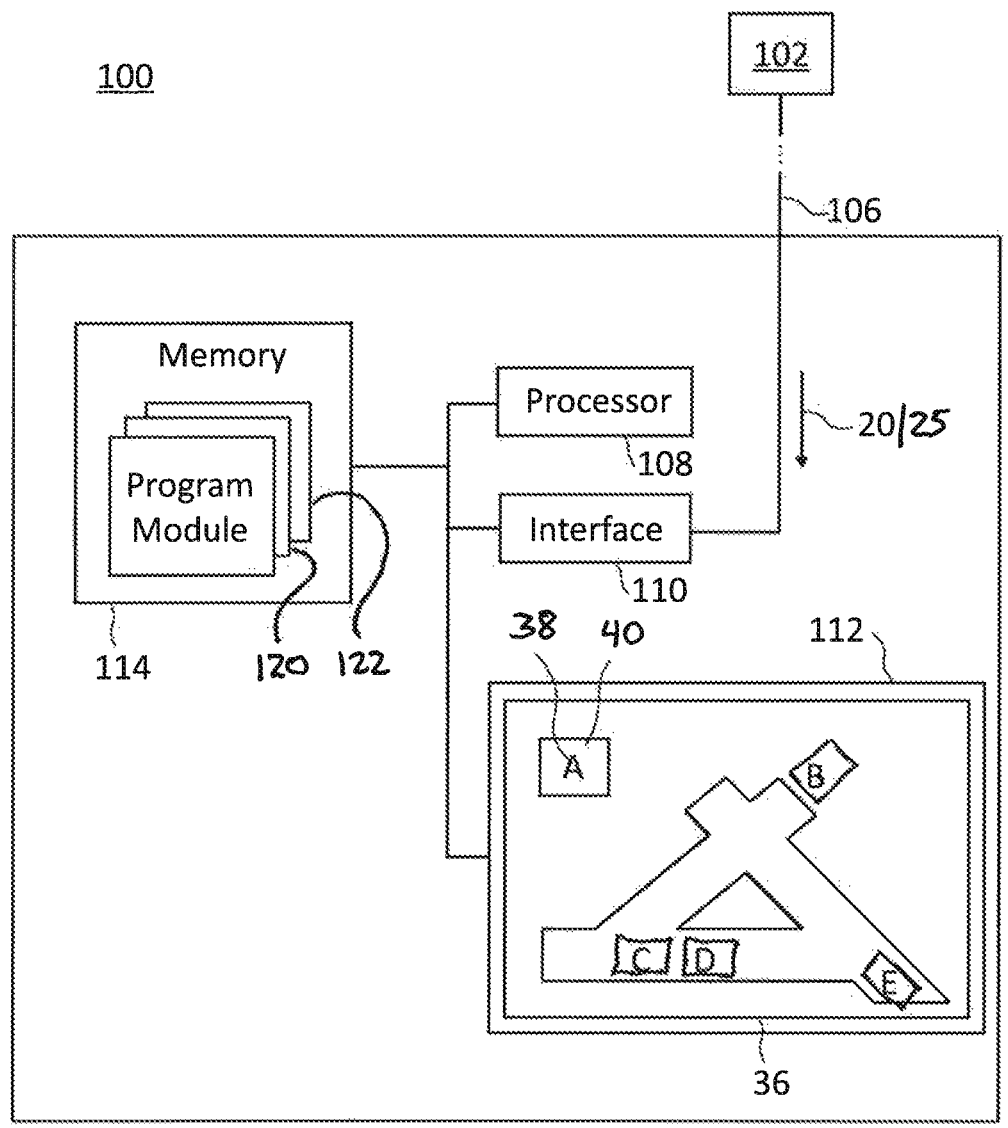
FIG. 3 is a schematic view of the identification system of FIG. 1, showing a pulse detection module, an air traffic object recognition module, and an air traffic identification module of the identification system.

With reference to FIG. 3, identification system 100 is shown. Identification system 100 includes a processor 108, a data interface 110, a user interface 112, and a memory 114. Processor 108 is disposed in communication with data interface 110, and therethrough with sensor 102 to receive therefrom image data 20 via data link 106. Processor 108 is also disposed in communication with user interface 112 for operative connection of user interface 112 for displaying an image 36 of airfield 10 (shown in FIG. 1).

Memory 114 has a plurality of program modules having instructions recorded thereon that, when read by processor 108, cause processor 108 to execute certain operation, e.g., the operations of an air traffic object identification method 200, as will be described. Among the modules are an air traffic object recognition module 120, to recognize shape 40 of air traffic objects on and in the environs of the airfield, and air traffic object identification module 122, to determine the identify 38 of air traffic objects on and in the environs of the airfield. Using It is contemplated that identification system 100 be implemented using circuitry, software, or a combination of both software and circuitry, as suitable for an intended application.

Figure 4:
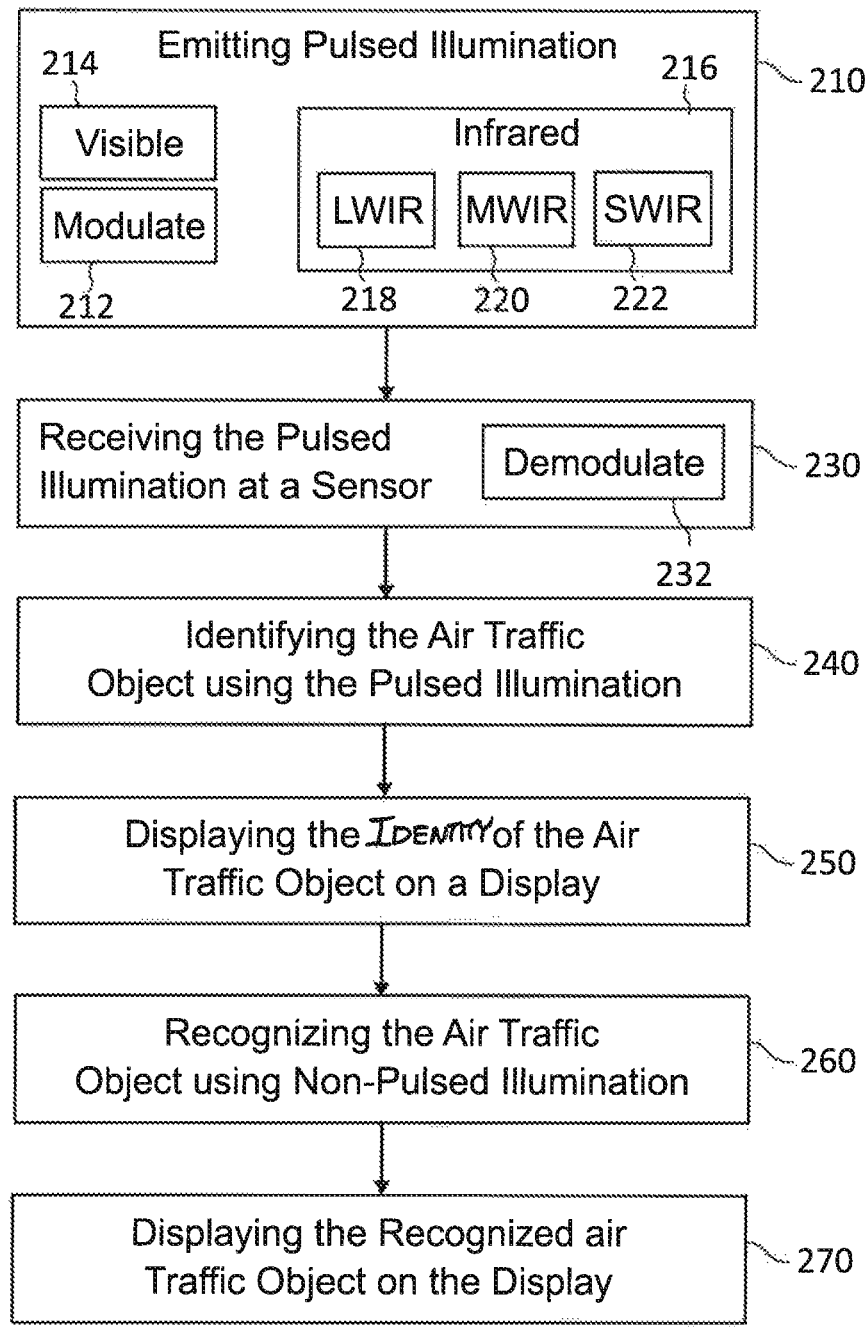
FIG. 4 is a block diagram of an air traffic object identification method, showing the steps of the method.

With reference to FIG. 4, air traffic object identification method 200 is shown. Air traffic object identification method 200 includes emitting pulsed illumination, e.g., pulsed illumination 24-32 (shown in FIGS. 2A-2E), as shown with box 210. The pulsed illumination is modulated to include information identifying an individual air traffic object, as shown with box 212. In certain embodiments the pulsed illumination can be within a visible wavelength waveband, as shown with box 214. In accordance with certain embodiments, the pulsed illumination can be within an infrared wavelength waveband, as shown with box 216. It is also contemplated that the pulsed illumination can be within an infrared sub-waveband, such as LWIR, MWIR, and/or SWIR wavebands, as shown with boxes 218-222.

Air traffic object identification method 200 also includes receiving the pulsed illumination at a sensor, e.g., pulse detection array 103 (shown in FIG. 1) and/or sensor 102 (shown in FIG. 1), as shown with box 230. The pulsed illumination is demodulated, as shown with box 232, and the air traffic object identified based on the information contained in the modulated illumination, as shown with box 240. The identity of the air traffic object is displayed on a user interface, e.g., user interface 112 (shown in FIG. 3), as shown with box 250. The user interface can be located remotely from an airfield while displaying at least a portion of the airfield and/or airfield environs, as shown in FIG. 3 in exemplary image (or video) 24. In certain embodiments the aircraft can also be recognized using illumination received at the sensor, as shown with box 250, such as with a shape recognition algorithm or similar utility, providing the flexibility to integrate air traffic objects without pulsed illuminator and/or in operative pulsed illuminators, as shown with box 260. The shape recognition can be displayed with the aircraft identity, as shown with box 270.

Commercial and military air traffic control is moving away from brick-and-mortar air traffic control towers and towards digital air traffic control centers. Digital imaging sensors mounted on a mast can improve the visibility that digital air traffic control center have by transmitting live imagery to air traffic controllers in a secure facility. This reduces on-airport footprint and leaves air traffic controllers less exposed to threats.

In embodiments described herein pulse detection arrays and pulsed emitters are employed to further improve visibility in digital air traffic control centers. In accordance with certain embodiments, pulse detection arrays and pulsed emitters are employed that employ SWIR, MWIR, and/or LWIR illumination to aircraft identification in digital air traffic control center. The identification can be augmented by with object recognition to facilitate one- and two-way communication between aircraft and between aircraft and digital air traffic control center. For example, pulsed LED infrared emitters carried on aircraft and a SWIR imager with pulse-detection pixel technology can be mounted on a mast with pan, tilt, and/or zoom capability. Such SWIR imagers can outperform visible sensors on hazy days for recognition purpose and the pulse detection capability will detect and positively identify distant aircraft at long-ranges. It is contemplated that this will allow for long-range, autonomous imaging and identification of aircraft with low rates of false-positive or false-negatives. Infrared imaging also has the benefit that, when employed in an environment having heavy atmospheric obscurants (dust, haze, smog, smoke), and the pulse detection array paired with pulsed illumination can provide long-range detection and identification of objects such as aircraft.

The methods and systems of the present disclosure, as described above and shown in the drawings, provide for long-range, autonomous imaging and identification of aircraft with superior properties including low rates of false-positive or false-negatives as well as the capability to image through heavy atmospheric obscurants. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An identification system for a digital air traffic control center, comprising:
    a sensor with a pulse detection array and having a field of view, the sensor and the pulse detection array individually generating image data and pulse data for recognizing and identifying the air traffic object using both the image data and pulse data generated, wherein the image data is generated using illumination reflected from the respective air traffic objects within the field of view of the sensor and the pulse data is generated using pulsed illumination modulated with information identifying the respective air traffic objects and emitted by a pulsed illuminator carried by the respective air traffic objects within the field of view of the sensor;
    a user interface to display the air traffic objects in the field of view of the sensor; and
    a controller having:
        a pulse detection module disposed in communication with the pulse detection array, wherein the pulse detection module is configured and adapted to demodulate the pulse data and identify an air traffic object using the demodulated pulse data; and
        an object recognition module disposed in communication with the sensor, wherein the object recognition module is configured and adapted to process the image data and recognize the air traffic object according to shape,
    wherein indications of the air traffic object's identity and shape are displayed by the user interface in association with display of the air traffic object.

2. The identification system as recited in claim 1, wherein the sensor is fixed to a mast or gimbal located at an airfield.

3. The identification system as recited in claim 1, wherein the field of view of the sensor includes controlled airspace in the vicinity of an airfield.

4. The identification system as recited in claim 1, wherein the user interface is remotely linked to the sensor.

5. The identification system as recited in claim 1, wherein the pulse detection array is a visible wavelength waveband pulse detection array.

6. The identification system as recited in claim 1, wherein the pulse detection array is a long-wave infrared (LWIR) waveband pulse detection array.

7. The identification system as recited in claim 1, wherein the pulse detection array is a mid-wave infrared (MWIR) waveband pulse detection array.

8. The identification system as recited in claim 1, wherein the pulse detection array is a short-wave infrared (SWIR) waveband pulse detection array.

9. The identification system as recited in claim 1, further comprising an air traffic object carrying the pulsed illuminator arranged for emitting the pulsed illumination.

10. The identification system as recited in claim 9, further comprising a pulsed illumination modulation module operatively associated with the pulsed illuminator and configured to modulate pulsed illumination emitted by the pulsed illuminator with the air traffic object identity.

11. The identification system as recited in claim 9, wherein the pulsed illuminator is one of a visible, infrared, LWIR, MWIR, and SWIR waveband pulsed illuminator.

12. The identification system as recited in claim 9, wherein the pulsed illuminator is configured to emit pulsed illumination in the visible, LWIR, MWIR, and SWIR wavebands.

13. The identification system as recited in claim 1, further comprising an aircraft recognition module disposed in communication with the sensor and operatively associated with the display.

14. A digital air traffic control center including the identification system as recited in claim 1.

15. A military or a civil airfield having a digital air traffic control center including the identification system as recited in claim 1.

16. An air traffic object identification method, comprising:
    receiving reflected and pulsed illumination at a sensor with a pulse detection array from an air traffic object within a field of view of the sensor, wherein the pulsed illumination is modulated with information identifying the air traffic object;
    individually generating image data and pulse data using the received reflected and pulsed illumination for recognizing and identifying the air traffic object using both the image data and pulse data generated;
    demodulating the pulsed data;
    identifying the air traffic object using the demodulated pulsed data;
    recognizing the air traffic object according to shape based on processing of the image data;
    displaying indications of the air traffic object's identity and shape in association with the air traffic object on a user interface disposed in communication with the sensor, the user interface being disposed remote from the field of view of the sensor.

17. The air traffic object identification method as recited in claim 16, further comprising modulating the pulsed illumination with identity of the air traffic object at the air traffic object.

18. The air traffic object identification method as recited in claim 16, wherein emitting pulsed illumination includes emitting visible, LWIR, MWIR, and/or a SWIR waveband illumination.

19. The air traffic object identification method as recited in claim 16, further comprising recognizing the air traffic object using the sensor.

20. The air traffic object identification method as recited in claim 16, wherein the identity of the air traffic object is done at a digital air traffic control center.

* * * * *